United States Patent [19]

Kemmerer et al.

[11] Patent Number: 4,719,131

[45] Date of Patent: Jan. 12, 1988

[54] THERMALLY CURABLE POLYACRYLATE COMPOSITIONS

[75] Inventors: Richard R. Kemmerer, Louisville; Byron K. Christmas, Jeffersontown, both of Ky.

[73] Assignee: Interez, Inc., Jeffersontown, Ky.

[21] Appl. No.: 869,544

[22] Filed: Jun. 2, 1986

[51] Int. Cl.[4] ............................................. B05D 3/02
[52] U.S. Cl. .................. 427/386; 427/388.2; 427/389.7; 427/393.5
[58] Field of Search .................. 427/385.5, 386, 388.2; 148/6.2

[56] References Cited

U.S. PATENT DOCUMENTS

| | | | |
|---|---|---|---|
| 4,026,826 | 5/1977 | Yoshida et al. | 260/25 |
| 4,374,963 | 2/1983 | Morgan et al. | 427/386 |
| 4,434,278 | 2/1984 | Skiscim | 525/531 |

*Primary Examiner*—Thurman K. Page
*Attorney, Agent, or Firm*—Herbert P. Price

[57] ABSTRACT

Thermally curable coating compositions having particularly good adhesion to metal substrates are made from a blend of a polyacrylate and phosphoric acid.

7 Claims, No Drawings

THERMALLY CURABLE POLYACRYLATE COMPOSITIONS

BACKGROUND OF THE INVENTION

This invention relates to thermally curable compositions. More particularly, this invention relates to thermally curable polyacrylate compositions.

Polyacrylates have been employed extensively in the formulation of radiation curable coatings. Generally, such radiation curable coating compositions are formulated on a 100%, or close to 100%, basis, i.e., very little or no inert volatile solvents are present. When such coatings are applied and cured, no volatile solvents need to be recovered or vented to the atmosphere, thereby reducing or eliminating environmental pollution concerns. Attempts have been made to use radiation curable coatings compositions in thermally curable systems in order to take advantage of the absence of solvents. However, the use of such polyacrylates in non-radiation curable coating applications has been extremely limited because polyacrylates, in many cases, do not cure in thin films by thermal free radical initiation due to extreme oxygen inhibition. High baking temperatures and long baking times are needed in order to obtain good cured films.

A modified polyacrylate composition that can be cured by radiation is described in U.S. Pat. No. 4,434,278. These modified polyacrylates are acrylic acid esters-phosphoric acid esters of diepoxides made by reacting acrylic acid and phosphoric acid with the diepoxide compound. There is no disclosure in the patent that such phosphate ester compositions will thermally cure.

U.S. Pat. No. 4,026,826 discloses curable compositions that are used as anti-fogging, abrasion resistant coatings. The curable compositions are comprised of a blend of a hydrolysate of a silicon compound which serves to improve abrasion resistance, and a polymerizable acrylate which serves as an anti-foggent. The hydrolysate of the silicon compound is cured by a condensation reaction through the hydroxyl groups using a curing catalyst, such as phosphoric acid or cobalt naphthenate. The acrylate is polymerized by any suitable means, such as by heating the mixture in the presence of a radical polymerization catalyst or irradiating it with ionizing radiation.

It is an object of this invention to prepare thermally curable polyacrylate compositions.

It is another object of this invention to prepare polyacrylate compositions that can be thermally cured to a tack-free film on metal substrates.

These and other objectives are obtained by preparing the compositions of the instant invention.

SUMMARY OF THE INVENTION

The composition of this invention is a blend of polyacrylate compound and phosphoric acid. Such a composition can be cured by heat at a temperature of at least 300° F., preferably, at least 350° F. for at least 10 minutes. The phosphoric acid is added in the range of about 5 to about 20 weight percent based on the total curable composition weight. The preferred polyacrylate compounds are acrylic acid esters of epoxy resins, particularly the diglycidyl ethers of dihydric phenols. The curable compositions of this invention find particular use as high adhesion coatings for metals.

DESCRIPTION OF THE INVENTION

Polyacrylate compounds useful in this invention are the well-known polyacrylate compounds which can be cured by ionizing radiation. Such polyacrylate compounds contain terminal or pendant acrylate groups. Preferably, the polyacrylate compositions will contain more than 1, and preferably, 2 to 4 acrylate groups. As used herein, the term acrylate includes acrylate, methacrylate and ethacrylate moieties.

Particularly preferred polyacrylate compounds that can be used in this invention are described in U.S. Pat. No. 3,450,613, which is hereby incorporated by reference. Such compositions are the diacrylate esters of diepoxide resins and are made by reacting acrylic, methacylic or ethacrylic acid with the diepoxide resin. Particularly useful polyepoxide resins are glycidyl polyethers of aromatic or aliphatic polyols. Examples of such glycidyl polyethers are glycidyl polyethers of resorcinol, hydroquinone, p,p'-dihydroxydiphenyl propane or Bisphenol A as it is commonly called, p,p'-dihydroxybenzophenone, p,p'-dihydroxybiphenyl, p,p'-dihydroxydiphenylethane, glycerine, trimethylolethane, trimethylolpropane, pentaerythritol, ethylene glycol, propylene glycol, 1,4-butanediol, hydrogenated bisphenol A and the like. Additional useful polyepoxides are those based on homo and copolymers of glycidyl acrylate and glycidyl methacrylate.

Additional polyacrylate compositions are the polyacrylated urethane resins, such as those described in U.S. Pat. No. 4,057,431, which is hereby incorporated by reference. Such urethane compositions are made by reacting a polyol which contains 2 or 3 hydroxyl groups with an organic polyisocyanate and a hydroxy alkyl acrylate or methacrylate. Other useful polyacrylate compounds are polyacrylated polyesters and polyamides.

As stated hereinbefore, polyacrylate compositions can be cured by radiation, e.g., ultra-violet or electron beam radiation. However, such compositions as thin films when heated require high temperatures and long heating periods to cure. Even the addition of free radical catalysts, i.e., organic peroxides, and azo compounds do not accelerate the cure appreciably. Surprisingly, such polyacrylate compositions can be thermally cured when phosphoric acid is incorporated in the formulations. The addition of peroxide catalysts with the phosphoric acid is not necessary. However, the presence of such catalysts is not detrimental to the coating composition.

The phosphoric acid used in this invention is orthophosphoric acid and can be utilized in its pure crystalline form or as its hydrate. It is preferred to use phosphoric acid in its usual commercial form, which is referred to as concentrated phosphoric acid. It contains about 80 to 90 weight percent phosphoric acid in water. However, more dilute solutions of phosphoric acid can be employed as long as the additional water does not interfere with the curing properties of the curable composition. The phosphoric acid is added to the polyacrylate compound in the amount of about 5 to about 20 weight percent based on the total weight of the curable composition, and preferably, at about 8 to about 10 weight percent. These phosphoric acid containing polyacrylate compositions have shelf lives of at least about 3 months.

The compositions of this invention can be applied to substrates using techniques well-known in the art, such as brushing, spraying, dipping, curtain or roll coating. The compositions are generally applied to a substrate to a thickness of about 0.2 to about 1 mil.

The compositions of this invention, when applied to metal substrates, wet the substrate and form good even level films with good film integrity. Acrylate compositions which do not contain phosphoric acid are poor film formers on metal substrates. Attempts to coat metal substrates with such non-phosphoric acid containing acrylates result in coatings which contained voids and poor film integrity.

After being applied as coatings, the compositions are thermally cured by heating at a temperature of about 300° F. to about 500° F., and preferably, about 350° F. to about 450° F. Enough time must be allowed to permit the compositions to cure. Generally, the curing time is in the range of about 10 to about 60 minutes.

In order to adjust the viscosity of the compositions of this invention to useable coating compositions, reactive diluents can be used. Reactive diluents as used herein are compounds which contain from about 1 to about 6 unsaturated groups per molecule. Such reactive diluents have viscosities of less than about 2000 cps at 75° C. and are liquid at room temperature, i.e., not gaseous or crystalline. Examples of reactive diluents are acrylate and methacrylate esters of $C_1$ to $C_{12}$ monohydric alcohols, vinyl esters of $C_2$ to $C_4$ monocarboxylic acids, vinyl aromatic monomers, vinyl heterocyclic monomers, acrylate and methacrylate esters of polyols, polyalkoxyalkyl esters of acrylic and methacrylic acid and the like. Specific examples of such compounds include vinyl acetate, ethyl acrylate, 2-ethylhexyl acrylate, methyl methacrylate, styrene, vinyl pyrrolidone, ethoxyethoxyethyl acrylate, hexanediol diacrylate, trimethylolpropane triacrylate, tripropylene glycol diacrylate, trimethylolethane trimethacrylate and the like. The amount of reacted diluent usually will vary up to about 75 weight percent, preferably, from about 20 to about 50 weight percent based on the total weight of the polyacrylate and the reactive diluent. The compositions of this invention can be compounded with polymeric materials containing no polymerizable unsaturation, as well as with immiscible polymeric or non-polymeric, organic or inorganic fillers, reinforcing agents or pigments in varying amounts.

Volatile organic solvents can be used in formulating the coating compositions of this invention. Examples of useful solvents are ketones, hydrocarbons, glycol ethers and the like. Such solvents include methyl ethyl ketone, methyl isobutyl ketone, toluene, xylene, monomethyl ether of ethylene glycol, monobutyl ether of propylene glycol, monoethyl ether of diethylene glycol and the like.

The compositions of this invention find particular utility when used in thermally curable systems to provide coatings for glass, plastics and metals, e.g., iron, steel, copper, aluminum and the like.

This invention is illustrated by the following examples. Parts and percentages are by weight unless otherwise expressed.

EXAMPLE 1

A mixture of 62 parts of Celrad 3700 (a diacrylate ester of the diglycidyl ether of Bisphenol A having an acrylate equivalent weight of 262, available from Celanese Speciality Resins, Inc.), 30 parts of tripropylene glycol diacrylate and 8 parts of 85% phosphoric acid was prepared. The resulting mixture was applied to tin-free steel panels at a thickness of about 0.5 mil using a No. 6 Meyer Rod. The coatings were heated for 10 minutes at 300° F. The coatings were well cured exhibiting a tack-free surface and methyl ethyl ketone (MEK) resistance of 19 double rubs. When heated at 400° F. for 10 minutes, the MEK resistance was greater than 200 double rubs. The adhesion of the coatings after the 300° F. cure and the 400° F. cure was 100%.

EXAMPLE 2

A mixture of 50 parts of Celrad 3700, 50 parts of tripropylene glycol diacrylate and 8 parts of 85% phosphoric acid was applied to tin-free steel panels at a thickness of about 0.5 mil using a No. 6 Meyer Rod. One panel was heated for 10 minutes at 300° F. The resulting film had a solvent resistance of 7 methylethyl ketone double rubs. When cured for 30 minutes at 300° F., another film had a solvent resistance of 15 double MEK rubs. After 10 minutes at 350° F., another film exhibited MEK solvent resistance of 180 double rubs. When heated at 400° F. for 10 minutes, the films had solvent resistance greater than 200 double rubs. All of the films exhibited excellent wetting of the substrate resulting in smooth even coatings with good to excellent adhesion to the substrate.

The same acrylate mixture without the phosphoric acid was drawn down on tin-free steel in the same manner as described above. The coatings were poor in wetting the substrate which resulted in crawling of the films with areas of no film coverage. These coatings did not cure when heated at 300° F. After heating at 400° F. for 10 minutes, the coating exhibited a solvent resistance of 148 MEK double rubs.

The same acrylate mixture was made using 2 parts of ditertiarybutylperoxide in place of the phosphoric acid. Films drawn down on tin-free steel as described above exhibited very poor wetting with no film formation but only beads. These compositions did not cure at 300° F., but did cure when heated at 400° F. for 10 minutes. The solvent resistance was 118 double rubs.

The same acrylate mixture was made using 8 parts of 2,2'-azobis(2-methylbutyronitrile) in place of the phosphoric acid. Again, films from this blend were poor in wetting the tin-free steel substrate. The composition showed MEK solvent resistance of 3 double rubs after heating at 300° F. for 10 minutes, 12 double rubs after 30 minutes at 300° F., 33 double rubs after 10 minutes at 350° F., 57 double rubs after 30 minutes at 350° F., and 62 double rubs after 10 minutes at 400° F.

EXAMPLE 3

A mixture of 50 parts of Celrad 3700, 50 parts of tripropylene glycol diacrylate, 8 parts of 2,2'-azobis(2-methylbutyronitrile) and 8 parts of 85% phosphoric acid was applied to tin-free steel panels at a thickness of about 0.5 mil using a No. 6 Meyer Rod. The panels were heated as indicated with the resulting cured properties as indicated by MEK solvent resistance:

| Temp. °F. | 300 | 300 | 350 | 350 | 400 |
| --- | --- | --- | --- | --- | --- |
| Time - Min. | 10 | 30 | 10 | 30 | 10 |
| MEK Double Rubs | 9 | 16 | 195 | >200 | >200 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A coating process which consists of:
   (a) forming a coating from a mixture of a polyacrylate and phosphoric acid;
   (b) applying the coating to a metal substrate; and
   (c) heating the coating at a temperature of about 300° F. to about 500° F. for a time sufficient to cure the coating, wherein the polyacrylate is comprised of the diacrylic acid ester of the diglycidyl ether of a dihydric phenol.

2. The process of claim 1 wherein the phosphoric acid is present in the amount of about 5 to about 20 weight percent based on the weight of the total composition.

3. The process of claim 2 wherein the phosphoric acid is present in the amount of about 8 to about 10 weight percent.

4. The process of claim 1 wherein the coating is heated at a temperature of about 350° F. to about 450° F.

5. The process of claim 1 wherein the polyacrylate contains more than 1 pendant or terminal acrylate group.

6. The process of claim 5 wherein the polyacrylate contains 2 to 4 acrylate groups.

7. The process of claim 1 wherein the dihydric phenol is Bisphenol A.

* * * * *